Jan. 15, 1935.  A. B. BEITMAN  1,988,412
WINDSHIELD
Original Filed Aug. 19, 1929   3 Sheets-Sheet 2
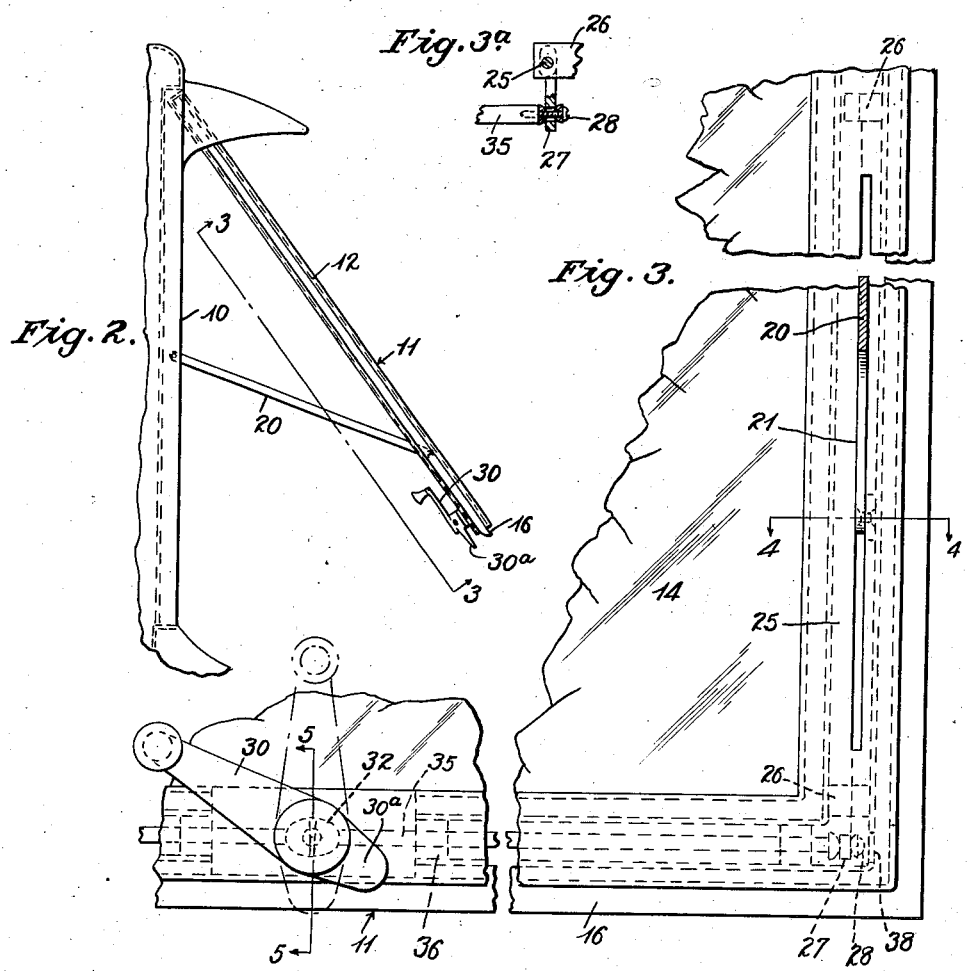
Inventor
*Albert B. Beitman*
By  *Bacon & Thomas*
Attorneys Jan. 15, 1935. A. B. BEITMAN 1,988,412
WINDSHIELD
Original Filed Aug. 19, 1929 3 Sheets-Sheet 3
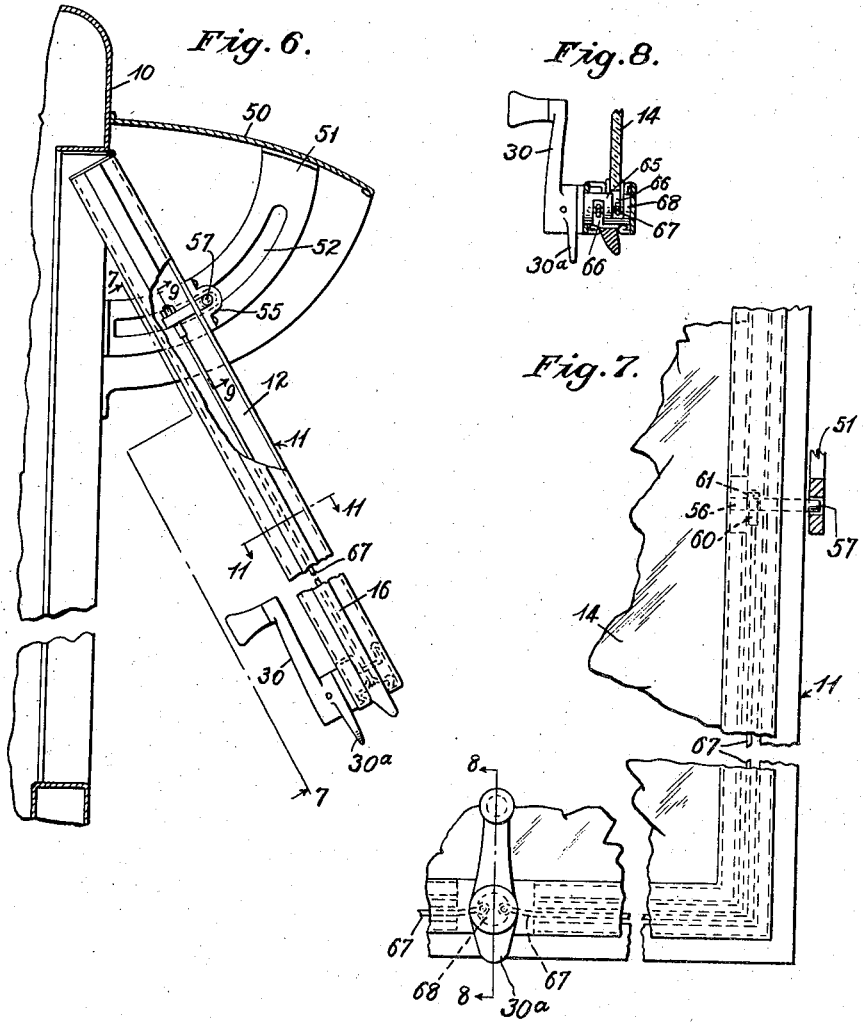
Inventor
Albert B. Beitman
By Bacon + Thomas
Attorneys Patented Jan. 15, 1935

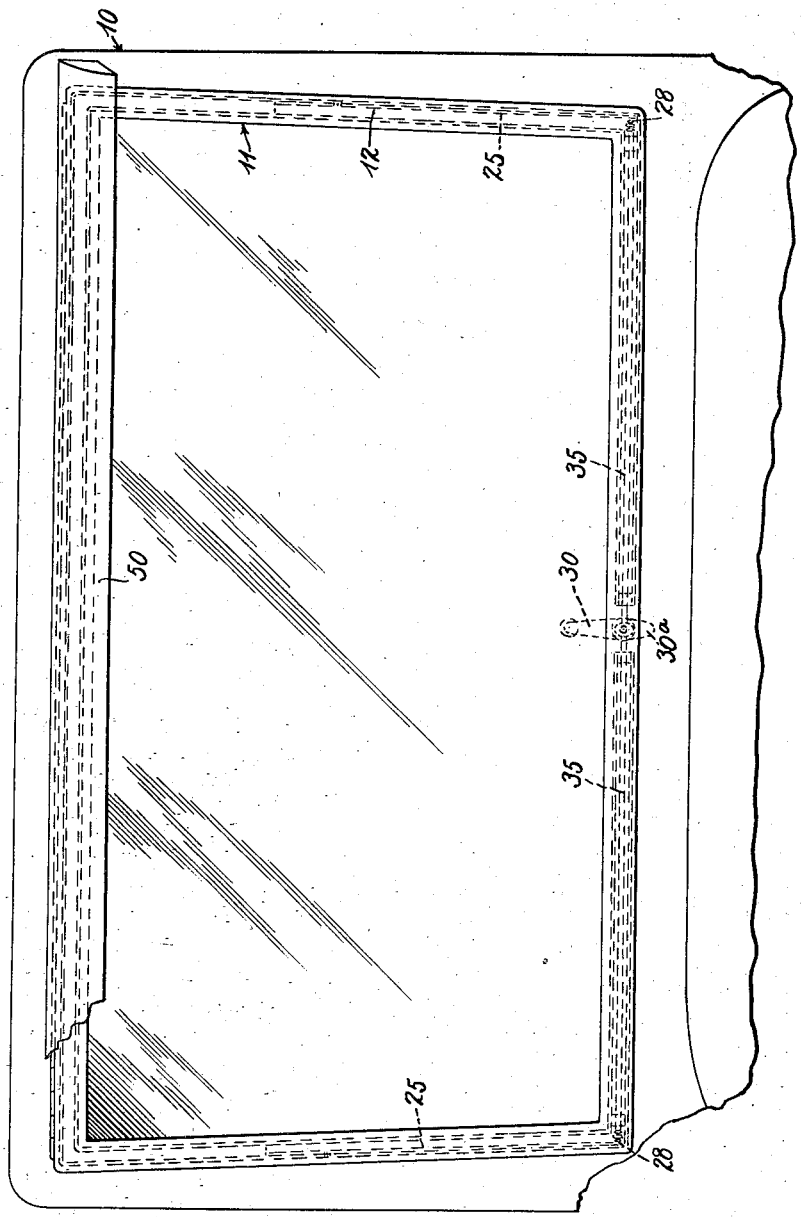

1,988,412

UNITED STATES PATENT OFFICE 1,988,412

WINDSHIELD

Albert B. Beitman, Cleveland Heights, Ohio

Original application August 19, 1929, Serial No. 386,780. Divided and this application August 6, 1931, Serial No. 555,623

4 Claims. (Cl. 296—84)

This invention relates to windshields for motor vehicles and particularly to the type of windshield which is hinged at one side to its frame to be opened and closed when desired.

This application is a division of my earlier filed application Serial No. 386,780, filed August 19, 1929.

The principal object of my invention is to provide means for locking the windshield in its open position as well as when closed, by a simple movement of a single lever or handle so that it is unnecessary to stop the car or take both hands from the steering wheel in making such adjustment.

A further object is to provide a rigid bracing means for the windshield when in its open positions which may be locked or released by the turn or movement of a handle or lever that is so located on the windshield that a direct thrust or pull on the lever will move the windshield to open or close the same.

A still further object is to provide a relatively inexpensive windshield adjusting device which is strong and durable and in which the parts are so constructed and arranged to preclude any objectionable rattling or chattering of such parts due to vibration of the car.

With these and such other objects in view as will be apparent from the following description, the invention resides in all the novel features of construction and combination of parts disclosed and particularly set forth in the appended claims.

In the drawings which form a part of this specification

Fig. 1 is a front elevation of the body of an automobile with the windshield operating mechanism shown in dotted lines;

Fig. 2 is a side elevation of the windshield in open position in its frame, the rear portion of the vehicle top being broken away;

Fig. 3 is an enlarged fragmental rear elevation of one side and bottom of the windshield, the brace bar being shown in section;

Fig. 3ª is a detail in perspective of parts of the locking mechanism;

Figs. 4 and 5 are detail sectional views taken on the lines 4—4 and 5—5 of Fig. 3 respectively;

Fig. 6 is a vertical section through the windshield frame, the windshield being shown in end elevation, illustrating a modified form of adjusting mechanism;

Fig. 7 is a fragmental rear elevation of one side and bottom portion of the windshield shown in Fig. 6;

Fig. 8 is a sectional view taken on the line 8—8 of Fig. 7;

Figs. 9 and 11 are sectional views taken on the lines 9—9 and 11—11 of Fig. 6; and Fig. 10 is a plan view of the cam member used in the form of device illustrated in Figs. 6 to 11 inclusive.

In describing my invention reference is made to the accompanying drawings in which like reference numerals are used to designate like parts in the several views, and in which the reference numeral 10 designates generally the outer stationary frame for a windshield, the frame constituting the front part of the top of an automotive vehicle. Within the frame there is hinged in the usual manner the windshield 11, which windshield may be of any particular shape desired.

The windshield 11 is made up of an outer hollow metallic frame or sash 12 channeled as at 13 to receive the pane of glass 14. About the three free edges the windshield is provided with a channel 15 in which is received a rubber gasket or sealing member 16 that contacts with the frame member 10 to form a waterproof joint between the sash 12 and frame 10 when the windshield is closed.

My preferred form of windshield adjusting and securing mechanism which is disclosed in Figs. 1 to 5 inclusive includes a pair of brace members, one being shown in each of Figs. 2 and 3, where it is designated 20. Each brace member has one of its ends hinged to one side of the frame member 10 while its opposite end is extended into a slot 21 provided in the back face of the corresponding end portion of the sash 12. To the inner end of each of the brace members 20 is secured a slide member 22 which is slidably received in the vertical ends of the sash, the slide members providing a bearing and guide for the braces 20 and also serve to hold the braces in the slots 21. Extending vertically within the channel end members of the sash 12 adjacent to and parallel with the slots 21 are cam shaped clamping members 25 each journaled at its upper and lower ends in suitable bearings 26. At the lower end each cam member 25 is provided with an integral extension 27 which extends at right angles to the length of the cam. (See Fig. 3ª.) Threaded through a suitable aperture in the outer end of each extension 27 is a screw 28.

A handle or crank member 30 located at the center of the lower edge of the sash 12 is secured to the outer end of a shaft 31 which extends into the hollow part of the sash. Within the sash the shaft 31 is provided with a cam shaped portion 32 against which the inner ends of slidable rods 35 bear, the rods 35 being longitudinally slidable in bearings 36 provided within the hollow sash and so positioned that the outer end of each rod engages the screw 28 which passes through the extension 27 of the upright cam member.

It will be apparent that in swinging the windshield 11 in its frame 10 the outer ends of the brace bars 20 will move up and down in slots 21. By turning the crank or handle member 30 the cam 32 forces the rods 35 outwardly against the inner end of the screws 28 rotating the upright cam members 35 in their bearings so that they engage the inner ends of the brace rods 20 binding them tightly in any desired position to which the windshield has been moved. The parts are so adjusted, through the medium of the screws 28, that the brace rods 20 will be firmly clamped against movement when the cam 32 is turned so that its major axis is substantially in alignment with the longitudinal axes of the rods 35, thus effecting a locking of the parts in holding position. As soon as the cam is shifted from this position, however, all parts become released and the sash may be swung freely.

To provide a positive lock for the windshield when it is in its closed position the handle member 30 is provided with an extension 30ª which when the handle is turned in the vertical position will engage the inner edge of the windshield frame 10 or a suitable bearing plate which may be provided.

The handle 30, it will be noted, is used both as a handle to grasp in pushing or pulling the windshield open or closed and that by only a slight twist of the handle the cam members 25 are moved into or out of engagement with the sliding brace rods 20. With only a slight movement of the cams 25 the inner ends of the brace rods 20 are clamped firmly in the channel of the windshield frame 12 so that there can be no rattling or chattering of the parts due to the vibration of the car. At each lower corner of the windshield in alignment with the screws 28 the sash 12 is provided with openings 38 through which a screw driver may be inserted to adjust screws 28 whereby adjustment may be made to take care of any wear of the rods 35 on the cam 32 or any wear of the vertical cam members 25 against inner ends of the brace rods 20.

In Figs. 6 to 11 inclusive I have illustrated a modified form of windshield adjusting and locking mechanism which may be operated by a single handle or lever member 30 positioned at the central lower portion of the windshield. In this form the front frame portion of the vehicle top is provided with the usual visor 50 and within each end of the visor there is mounted an arcuate bracket membera 51 provided with an arcuate slot 52 formed concentric with the hinge of the windshield. At each end the sash 12 of the windshield is provided with a bearing member 55 in which a shaft 56 is journaled. The outer end 57 of the shaft is cam shaped which cam portion is positioned to ride freely in the arcuate slot 52 in the bracket. On the inner end the shaft 56 is provided with an extension 58 extending at right angles therefrom and into the channel or hollow portion of the sash 12. The free end of the extension 58 is provided with an aperture 59 in which a tubular member 60 fits, the outer end of the tubular member being threaded to receive a nut 61. The handle or lever 30 journaled at the lower central portion of the sash 12 is provided with the extension 30ª which constitutes a lock for the windshield when in its closed position the same as in the form illustrated in Figs. 1 to 5. Within the hollow of the sash 12 the shaft 65, to the outer end of which the handle 30 is secured, is provided with oppositely disposed slots 66 in which the inner ends of wire cables or the like 67 are secured by means of pins 68, the pins 68 being positioned eccentric with respect to the axis of rotation of the shaft 65. It will be understood that the fit, or connection, between the tubular member 60 and the aperture 59 is sufficiently tight to bring about movement of the shaft 56 when the handle 30 is moved to push the cable 67 and yet is not so tight that adjustment cannot be accomplished between the tubular member and the extension 58 by actuation of the nut 61.

The sash 12 of the windshield is provided around its lower edge and ends with the channel 15 in which the upper gasket member 16 fits. In the bottom wall of the channel 15 there is provided a groove 69 in which the wire cable 67 is slidably received. The outer ends of the wire cables 67 are secured in the tubular members 60 in any suitable manner such as by enlarging the end of the wire to tightly engage a constricted portion 70 in the tubular member as shown in Fig. 9. It will be apparent that by partial rotation of the handle 30 the wire cable members which are secured to the pins 68, as illustrated in Fig. 7, are tightened thereby pulling downward on the lever 58 of the shaft 56, twisting the cam portions 57 in the slots 52 with a binding action whereby the windshield is securely held in any desired open position. This result is assured by providing sufficient friction in the bearing of the shaft 65 and proportioning the parts so that the pins 68 to which the wires or cables 67 are attached, and which are in effect cranks, will be substantially on "dead center", so to speak, when the mechanism is in holding condition. By adjusting the nut 61 on the tubular member 60 any stretch of the wire or wear of the cam portion 57 in the slot 52 may be taken up.

By providing the groove 69 in the manner illustrated in which the wires 67 fit, it is only necessary to remove the rubber weather strip 16 to have free access to the wire to repair or replace the same. In practice, the portions of the grooves (through which the wires or cables 67 play) adjacent the corners of the sash should be sufficiently rounded and of ample radius to avoid undue strain and friction on the wires or cables.

In this form of device the lever 30 again serves as the handle to be grasped in pushing or pulling the windshield open or closed and by a partial turn of the same the windshield may be locked in any desired position or released from such position, so that it is necessary to use only one hand in manipulating the windshield. Since the cable member 67 fits snugly within its channel 69 and the cam member 56 is journaled in the bearing 55 closely fitting the same, there are no parts free to rattle under the vibration of the car.

It will be apparent of course that the brackets 51 may be separate from the visor member 50 or the slot 52 may be formed in the ends of the visor itself.

While I have illustrated only two forms of windshield adjusting mechanism, it is obvious that various changes may be made in the construction of the same without departing from the spirit of the invention or the scope of the appended claims.

What I claim as new is:

1. In combination, a windshield frame of a vehicle, a windshield pivotally mounted therein for upward and outward movement, an arcuate bracket member provided with an arcuate slot formed concentric with the hinge of the windshield, a handle element secured to the shield, a retaining device including a double faced cam rockable into binding engagement with the curved surfaces of the arcuate slot and a connection between the handle and the clamping device for fixing the shield in any desired position of adjustment relative to the arcuate member.

2. Bracing means for a windshield comprising an arcuate bracket member rigidly supported and provided with an arcuate slot, a rotatable double faced cam slidably associated with said slot, and means for rotating the cam to cause the latter to frictionally bind against the opposed curved surfaces of the slot.

3. In combination, a windshield frame of a motor vehicle, a windshield pivotally mounted therein for upward and outward swinging movement, said windshield possessing a hollow marginal portion, an arcuate bracket secured to the windshield frame adjacent one edge of the windshield and having an arcuate slot concentric with the pivot axis for the windshield, and securing means for holding the windshield in any desired position of adjustment, said securing means including a shaft journalled for rotation on one of the marginal portions of the windshield, a cam formed on one extremity of the shaft and adapted to occupy the said slot during all positions of movement of the windshield, a flexible cable operatively connected to said shaft and arranged within the said tubular marginal portion of the windshield, and a handle carried by the windshield to move therewith and operatively connected to the cable to cause longitudinal movement of the cable in opposite directions for rocking the shaft to cause the cam of the shaft to assume gripping and non-gripping positions with respect to the edges of said slot.

4. In combination, a windshield frame of a motor vehicle, a windshield pivotally mounted therein for upward and outward movement, and means for retaining the windshield in any desired position of adjustment, said means comprising a bracket immovably secured to the windshield frame and having an arcuate slot concentric with the pivotal axis for the windshield, a shaft rockably journalled upon said windshield, said shaft having a cam formed at one end and arranged to occupy said arcuate slot at all times and a lateral extension removed from the cam, a cable connected to the extremity of the lateral extension, and a rotatable handle carried by the windshield to partake of the movements of the latter and operatively connected to the cable causing rotation of the handle in opposite directions to bring about longitudinal movement of the cable in opposite directions for rocking said shaft to cause the cam to assume gripping and non-gripping positions with respect to the edges of said arcuate slot.

ALBERT B. BEITMAN.